United States Patent
Delfort et al.

(10) Patent No.: US 6,423,107 B1
(45) Date of Patent: Jul. 23, 2002

(54) DETERGENT COMPOSITIONS FOR GASOLINE-TYPE FUELS THAT CONTAIN POLYTETRAHYDROFURAN DERIVATIVES

(75) Inventors: Bruno Delfort, Paris; Stéphane Joly, Bougival; Thierry Lacôme, Garches; Patrick Gateau, Maurepas; Fabrice Paille, Limay, all of (FR)

(73) Assignee: Institut Francais du Petrole, Cedex (FR)

( * ) Notice: Subject to any disclaimer, the term of this patent is extended or adjusted under 35 U.S.C. 154(b) by 0 days.

(21) Appl. No.: 09/636,740

(22) Filed: Aug. 11, 2000

(30) Foreign Application Priority Data

Aug. 12, 1999 (FR) .............................. 99 10506

(51) Int. Cl.$^7$ .............................................. C10L 1/18
(52) U.S. Cl. ........................................ 44/443; 44/447
(58) Field of Search ................. 44/447; 568/617, 568/625

(56) References Cited

U.S. PATENT DOCUMENTS

| | | | |
|---|---|---|---|
| 3,344,088 A | * 9/1967 | Miller | |
| 3,382,055 A | 5/1968 | Jacobson et al. | 44/62 |
| 4,211,854 A | * 7/1980 | Robinson | 525/410 |
| 4,445,908 A | * 5/1984 | Compere et al. | 44/443 |
| 4,481,123 A | 11/1984 | Hentschel et al. | |
| 4,918,119 A | * 4/1990 | Seltmann et al. | 523/461 |
| 5,024,678 A | * 6/1991 | Mertens-Gottselig et al. | 44/448 |
| 5,118,721 A | * 6/1992 | Godoy et al. | 521/103 |
| 5,441,544 A | * 8/1995 | Cherpeck | 44/435 |
| 5,569,310 A | * 10/1996 | Cherpeck | 44/443 |
| 5,741,946 A | 4/1998 | Wei | 568/617 |
| 5,873,917 A | * 2/1999 | Daly | 44/443 |

FOREIGN PATENT DOCUMENTS

| | | |
|---|---|---|
| DE | 3210283 A1 | 9/1983 |
| DE | 3244077 A1 | 5/1984 |
| EP | 0 665 206 A1 | 8/1995 |
| WO | WO 94/14925 | 7/1994 |
| WO | WO 95/17484 | 6/1995 |
| WO | WO 98/44022 | 10/1998 |

OTHER PUBLICATIONS

XP–002135153—Chemical Abstracts, vol. 104, No. 6, Feb. 1986, Ozawa S. et al. Polyurethane elastomers, p. 68.
62050321—Patent Abstract of Japan, vol. 011, No. 242(C–438), Aug. 7, 1987.

* cited by examiner

*Primary Examiner*—Margaret Medley
(74) *Attorney, Agent, or Firm*—Millen, White, Zelano & Branigan, P.C.

(57) ABSTRACT

Detergent additive compositions for gasoline-type fuels comprise at least one compound that corresponds to the general formula:

(I)

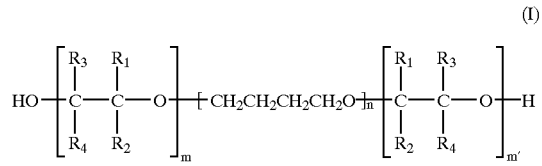

in which R1, R2, R3 and R4 each represent a hydrogen atom or a hydrocarbon radical, for example alkyl, with 1 to 30 carbon atoms, whereby at least one of R1, R2, R3, and R4 is a hydrocarbon radical, n is a number from 1 to 20, m and m' are each a number from 1 to 30, with m+m' from 4 to 60. They can be added to gasoline-type fuels at a concentration of 20 to 5000 mg/liter.

16 Claims, No Drawings

DETERGENT COMPOSITIONS FOR GASOLINE-TYPE FUELS THAT CONTAIN POLYTETRAHYDROFURAN DERIVATIVES

The invention relates to new compositions of detergent additives for gasoline-type fuels and the compositions of fuels that contain them, alone or mixed with other detergent additives.

It is known that automobile engines have a tendency to form deposits on the surface of the engine elements, in particular on the carburetor orifices, the bodies of butterfly valves, fuel injectors, cylinder orifices and intake valves, because of oxidation and polymerization of various hydrocarbon-containing components of the fuel. These deposits, even when they are present only in small amounts, are often responsible for significant driving problems, such as the engine timing and poor acceleration. In addition, deposits in the engine can significantly increase the consumption of fuel and the production of pollutants. This is why the development of effective detergent additives for regulating these deposits assumes a considerable importance and was already the object of much research.

A new family of compounds that exhibit good effectiveness as additives that are intended to reduce the deposits in the injectors and in the intake valves has now been discovered.

The detergent additive compositions for gasoline-type fuels of the invention comprise at least one compound that corresponds to the following general formula (I):

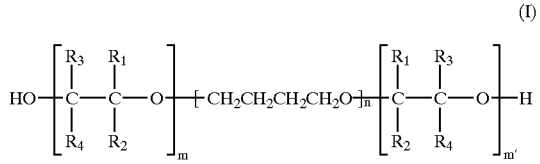

(I)

in which $R_1$, $R_2$, $R_3$ and $R_4$ each represent a hydrogen atom or a hydrocarbon radical, for example alkyl, with 1 to 30 carbon atoms, whereby at least one of $R_1$, $R_2$, $R_3$ and $R_4$ is a hydrocarbon radical; n is a number from 1 to 20, preferably from 1 to 10, m and m' are each a number from 1 to 30, for example, from 1 to 20, preferably from 1 to 10, with m+m' from 4 to 60, preferably from 5 to 30.

In the same formula, the concatenations:

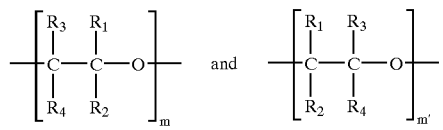

can respectively consist of patterns:

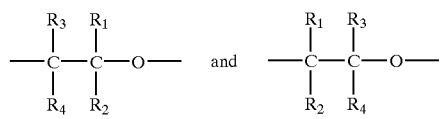

that differ from one another by the nature of R1, R2, R3 and/or R4.

The compounds that are used in the invention generally come in the form of mixtures of compounds that differ from one another by the value of n, m and/or m' and/or by the nature of radicals R1, R2, R3 and R4. Rather than compounds, it is then possible to speak of compositions.

The synthesis of the compounds or compositions defined above can be carried out as described below.

In a first stage, the polymerization of the tetrahydrofuran is carried out according to a known procedure and described, for example, in the work of P. Dreyfuss (Polytetrahydrofuran, Gordon and Beach Science Publishers, New York, 1982) in the presence of an acid catalyst, to obtain a polytetrahydrofuran of general formula (II):

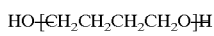

The polytetrahydrofurans that are being considered may have a mean molar mass of 200 to 3000.

The polytetrahydrofuran that is formed is then reacted with one or more compounds that have an epoxide function, of general formula (III):

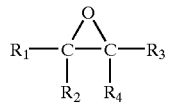

in which R1, R2, R3, and R4 represent a hydrogen atom or a hydrocarbon radical, for example alkyl, with 1 to 30 carbon atoms, whereby at least one of R1, R2, R3 and R4 is a hydrocarbon radical.

The conditions of the reaction are in general the following:

The polytetrahydrofuran is mixed with, for example, sodium hydride (at a rate of, for example, about 0.4% by weight). After having purged, under stirring, the reactor of the released hydrogen, the epoxide or an epoxide mixture is introduced in an amount that is calculated to obtain the desired value of m+m', at a temperature of 80 to 180° C., and the reaction mixture is kept at this temperature until the end of the consumption of the epoxide or epoxides. After returning to ambient temperature, the medium is diluted with an organic solvent, for example a hydrocarbon solvent, such as heptane, it is washed with water one or more times, then, after evaporation under reduced pressure of the organic phase, the desired product that corresponds to general formula (I) is obtained.

In the invention, the detergent additive compositions as defined above can be added to gasoline-type fuels at concentrations of, for example, 20 to 5000 mg/liter. They can also be used mixed with any other detergent compound.

The following examples illustrate the invention without limiting its scope.

EXAMPLE 1

In a reactor that makes it possible to operate under pressure, equipped with a stirring system, a system for introducing reagents, a system for measuring temperature and pressure, 50 g of a polytetrahydrofuran with a mean molar mass equal to 250 and 0.2 g of sodium hydride are introduced. After having purged, under stirring, the reactor of the released hydrogen, 235 g (3.26 mol) of 1,2-epoxybutane is introduced. The medium is gradually brought to the temperature of 145° C., and it is kept at this temperature until the drop in pressure indicates the end of the consumption of 1,2-epoxybutane. After returning to ambient temperature, the medium is diluted with heptane, washed with 2×50 g of water, then, after evaporation under reduced pressure of the organic phase, 275 g of a clear pale yellow liquid is obtained that is soluble in gasoline and whose structure corresponds to the general formula:

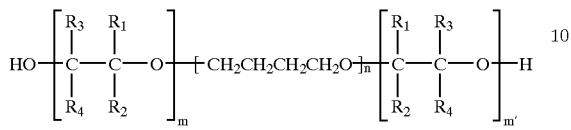

in which R1=R2=R3=H; R4=—CH$_2$—CH$_3$;

$n_{mean}$=3.5; and $(m+m')_{mean}$=16.

EXAMPLE 2

In a reactor that makes it possible to operate under pressure, equipped with a stirring system, a system for introducing reagents, and a system for measuring temperature and pressure, 50 g of a polytetrahydrofuran with a mean molar mass that is equal to 250 and 0.2 g of sodium hydride are introduced. After having purged, under stirring, the reactor of the released hydrogen, 160 g (2.22 mol) of 1,2-epoxybutane is introduced. The medium is gradually brought to the temperature of 145° C., and it is kept at this temperature until the drop in pressure indicates the end of consumption of 1,2-epoxybutane. After returning to ambient temperature, the medium is diluted with heptane, washed with 2×50 g of water, then, after evaporation under reduced pressure of the organic phase, 205 g of a clear pale yellow liquid is obtained that is soluble in gasoline and whose structure corresponds to the general formula:

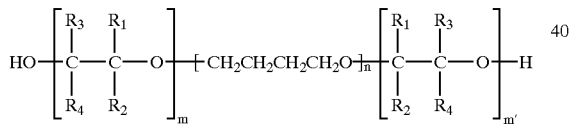

in which R1=R2=R3=H; R4=—CH$_2$—CH$_3$;

$n_{mean}$=3.5 and $(m+m')_{mean}$=11.

EXAMPLE 3

In a reactor that makes it possible to operate under pressure, equipped with a stirring system, a system for introducing reagents, a system for measuring temperature and pressure, 50 g of a polytetrahydrofuran with a mean molar mass that is equal to 250 and 0.2 g of sodium hydride are introduced. After having purged, under stirring, the reactor of the released hydrogen, 290 g (4.02 mol) of 1,2-epoxybutane is introduced. The medium is gradually brought to the temperature of 145° C., and it is kept at this temperature until the drop in pressure indicates the end of the consumption of 1,2-epoxybutane. After returning to ambient temperature, the medium is diluted with heptane, washed with 2×50 g of water, then, after evaporation under reduced pressure of the organic phase, 335 g of a clear pale yellow liquid is obtained that is soluble in gasoline and whose structure corresponds to the general formula:

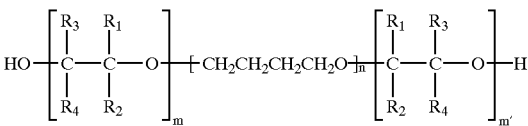

in which R1=R2=R3=H; R4=—CH$_2$—CH$_3$;

$n_{mean}$=3.5 and $(m+m')_{mean}$=20.

EXAMPLE 4

In a reactor that makes it possible to operate under pressure, equipped with a stirring system, a system for introducing reagents, a system for measuring temperature and pressure, 50 g of a polytetrahydrofuran with a mean molar mass that is equal to 250 and 0.2 g of sodium hydride are introduced. After having purged, under stirring, the reactor of the released hydrogen, 125.8 g (1.74 mol) of 1,2-epoxybutane and 54.2 g of 1,2 epoxydodecane (0.29 mol) are introduced. The medium is gradually brought to the temperature of 145° C., and it is kept at this temperature for 5 hours. After returning to ambient temperature, the medium is diluted with heptane, washed with 2×50 g of water, then, after evaporation under reduced pressure of the organic phase, 212 g of a clear pale yellow liquid is obtained that is soluble in gasoline and whose structure corresponds to the general formula:

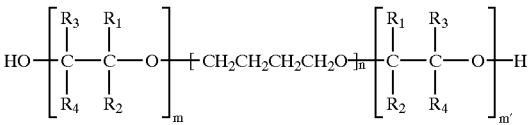

in which R1=R2=R3=H; R4=—CH$_2$—CH$_3$ and —(CH$_2$)$_9$—CH$_3$;

$n_{mean}$=3.5 and $(m+m')_{mean}$=10.

EXAMPLE 5

The products that are prepared in the preceding examples are evaluated as additives for their detergent properties at a concentration of 400 mg/liter in an unleaded gasoline with a "research" octane number of 96.8 and whose characteristics are as follows:

| | |
|---|---|
| Density at 15° C. | 753.9 kg/m$^3$ |
| Reid vapor pressure | 60.2 kPa |
| Lead content | <2 mg/l |
| Distillation | |
| Starting point | 33.0° C. |
| 5% | 45.9° C. |
| 10% | 51.2° C. |
| 20% | 61.1° C. |
| 30% | 73.1° C. |
| 40% | 88.3° C. |
| 50% | 104.2° C. |
| 60% | 116.0° C. |
| 70% | 125.6° C. |
| 80% | 138.5° C. |
| 90% | 155.6° C. |
| 95% | 169.8° C. |
| End point | 189.0° C. |

The evaluation is carried out with a test on a Mercedes M102E engine according to the CEC-F-05-A-93 method. The duration of this test is 60 hours. This method makes it possible to evaluate the amount of deposits that are formed on the intake valves of the engine.

The results that appear in the following table show the effect of the products of the invention for reducing the deposits on the intake valves.

TABLE

| Additive | Content (mg/l) | Deposited Material on the Intake Valves (mg) | | | | |
|---|---|---|---|---|---|---|
| | | Valve 1 | Valve 2 | Valve 3 | Valve 4 | Mean |
| None | 0 | 241 | 275 | 272 | 312 | 275 |
| Product of Example 1 | 400 | 70 | 57 | 76 | 65 | 67 |
| Product of Example 4 | 400 | 43 | 6 | 17 | 4 | 17.5 |

What is claimed is:

1. A composition of gasoline fuel comprising gasoline and, as a detergent additive, a detergency effective amount of at least one compound of formula (I):

wherein in which $R_1$, $R_2$, $R_3$, and $R_4$ are each, independently, a hydrogen atom or a hydrocarbon radical having 1 to 30 carbon atoms, wherein at least one of $R_1$, $R_2$, $R_3$, and $R_4$ is a hydrocarbon radical having 1 to 30 carbon atoms;

n is a number from 1 to 20; and m and m' are each a number from 1 to 30, with m+m' being 4 to 60.

2. A composition according to claim 1, wherein the concatenations:

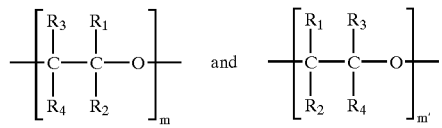

consist respectively of patterns:

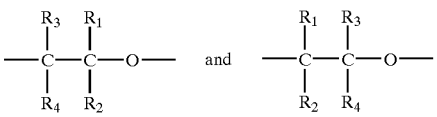

that differ from one another by the nature of $R_1$, $R_2$, $R_3$ and/or $R_4$.

3. A composition according to claim 1, wherein n is a number from 1 to 10, m and m' are each a number from 1 to 20, and m+m' is from 5 to 30.

4. A composition according to claim 1, wherein $R_1$, $R_2$, $R_3$ and/or $R_4$ are each, independently, H or an alkyl radical having 1 to 30 carbon atoms, wherein at least one of $R_1$ to $R_4$ is an alkyl radical having 1 to 30 carbon atoms.

5. A composition according to claim 1, wherein said composition comprises at least two compounds of formula (I) that differ from one another by the value of n, m and/or m' and/or by the nature of at least one of radicals $R_1$ to $R_4$.

6. A composition according to claim 1, wherein said at least one compound is present at a concentration of 20 to 5000 mg/liter of said gasoline.

7. A composition according to claim 1, further comprising at least one other detergent compound.

8. A composition according to claim 1, wherein n is a number from 1 to 10, m and m' are each a number from 1 to 10, and m+m' is from 5 to 30.

9. A composition according to claim 1, wherein n is a number from 1 to 10.

10. A composition according to claim 1, wherein m and m' are each a number from 1 to 10.

11. A composition according to claim 1, wherein m+m' is from 5 to 30.

12. A composition according to claim 1, wherein $R_1$, $R_2$ and $R_3$ are each H.

13. A composition according to claim 12, wherein $R_4$ is —$CH_2$—$CH_3$.

14. A composition according to claim 12, wherein $R_4$, in each case is —$CH_2$—$CH_3$ or $(CH_2)_9$—$CH_3$—.

15. A composition according to claim 6, wherein said at least one compound is present at a concentration of 20 to 400 mg/liter of said gasoline.

16. A composition according to claim 6, wherein said at least one compound is present at a concentration of 400 to 5000 mg/liter of gasoline.

* * * * *